(12) United States Patent
Koehler et al.

(10) Patent No.: US 9,002,090 B2
(45) Date of Patent: Apr. 7, 2015

(54) FORWARD PROJECTION APPARATUS

(75) Inventors: Thomas Koehler, Norderstedt (DE);
Bernhard Johannes Brendel,
Norderstedt (DE); Holger Schmitt,
Hamburg (DE); Rolf Dieter Bippus,
Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 205 days.

(21) Appl. No.: 13/988,349

(22) PCT Filed: Nov. 16, 2011

(86) PCT No.: PCT/IB2011/055123
§ 371 (c)(1),
(2), (4) Date: May 20, 2013

(87) PCT Pub. No.: WO2012/069964
PCT Pub. Date: May 31, 2012

(65) Prior Publication Data
US 2013/0243297 A1 Sep. 19, 2013

(30) Foreign Application Priority Data
Nov. 25, 2010 (EP) .................................. 10192558

(51) Int. Cl.
*G06K 9/00* (2006.01)
*G06T 11/00* (2006.01)

(52) U.S. Cl.
CPC ............. *G06T 11/005* (2013.01); *G06T 11/008* (2013.01); *G06T 2211/424* (2013.01)

(58) Field of Classification Search
None
See application file for complete search history.

(56) References Cited

U.S. PATENT DOCUMENTS

| 5,847,711 A | 12/1998 | Kaufman et al. |
| 6,525,729 B1 | 2/2003 | Akerman et al. |
| 6,862,015 B2 | 3/2005 | Fujioka et al. |

(Continued)

FOREIGN PATENT DOCUMENTS

| EP | 1437688 B1 | 11/2007 |
| WO | 9847105 A1 | 10/1998 |

OTHER PUBLICATIONS

De Man, B., et al.; Distance-driven projection and backprojection in three dimensions; 2004; Phys. Med. Biol.; 49:2463-2475.

(Continued)

*Primary Examiner* — Stephen R Koziol
*Assistant Examiner* — Amandeep Saini (57) ABSTRACT

The invention relates to a forward projection apparatus for performing a forward projection through an image (22), wherein at least one of a number of rays (20, 21) for performing the forward projection, a ray spacing between the rays and a kernel width of an interpolation kernel for calculating interpolated values located on the rays is varied depending on the ray width relative to an effective image element spacing between image elements (24) of the image. This allows reducing artifacts in simulated projection data and, thus, in an image, which is iteratively reconstructed by using the simulated projection data. For example, if the number of provided rays and/or the ray spacing between the provided rays is varied, aliasing artifacts can be reduced. Moreover, if the ray spacing between the provided rays and/or the kernel width of the interpolation kernel is varied, artifacts caused by varying effective kernel widths may be reduced.

13 Claims, 8 Drawing Sheets

(56) References Cited

U.S. PATENT DOCUMENTS

| | | |
|---|---|---|
| 7,538,767 B2 | 5/2009 | Fossum et al. |
| 7,786,991 B2 | 8/2010 | Reshetov et al. |
| 2010/0119034 A1 | 5/2010 | Hein et al. |

OTHER PUBLICATIONS

Joseph, P. M.; An Improved Algorithm for Reprojecting Rays Through Pixel Images; 1982; IEEE Trans. on Medical Imaging; vol. MI-1(3)192-196.

Lewitt, R. M.; Multidimensional digital image representations using generalized Kaiser-Bessel window functions; 1990; J. Optical Society of America; 7(10)1834-1846.

Matej, S., et al.; Practical Considerations for 3-D Image Reconstruction Using Spherically Symmetric Volume Elements; 1996; IEEE Trans. on Medical Imaging; 15(1)68-78.

Nielsen, T., et al.; Cardiac cone-beam CT volume reconstruction using ART; 2005; Med. Phys.; 32(4)851-860.

Thibault, J-B., et al.; A three-dimensional statistical approach to improved image quality for multislice helical CT; 2007; Med. Phys.; 34(11)4526-4544.

1
FORWARD PROJECTION APPARATUS

FIELD OF THE INVENTION

The invention relates to a forward projection apparatus, a forward projection method and a computer program for performing a forward projection through an image. The invention relates further to a reconstruction apparatus for iteratively reconstructing an image of a region of interest, which comprises the forward projection apparatus, and an imaging apparatus for generating an image of a region of interest, which comprises an acquisition unit for acquiring projection data and the reconstruction apparatus.

BACKGROUND OF THE INVENTION

For iteratively reconstructing an image from projection data, which can be acquired by using a computed tomography system, in an iteration step a forward projection through an actual image can be performed for generating simulated projection data, a difference between the simulated projection data and the acquired projection data can be determined, and the difference can be backprojected for updating the actual image. Several of these iteration steps can be performed, until a termination condition is fulfilled.

The forward projection can be implemented as disclosed in the article "An Improved Algorithm for Reprojecting Rays Through Pixel Images" by P. M. Joseph, IEEE TMI, MI-1, pages 192-196 (1982), wherein the image is divided into image elements arranged in a rectangular grid and wherein an interpolation kernel is used for interpolating image elements arranged along a line being parallel to a main axis of the grid for calculating interpolated values located on rays along which the forward projection is performed. The interpolated values, which are located on a same ray, are summed for generating a projection value. Projection values determined for several rays form the simulated projection data.

The iterative reconstruction using the above described forward projection may lead to image artifacts, thereby decreasing the quality of the reconstructed image.

SUMMARY OF THE INVENTION

It is an object of the present invention to provide a forward projection apparatus, a forward projection method and a computer program for performing a forward projection through an image, wherein the quality of simulated projection data and, thus, of an image, which has been iteratively reconstructed by using the simulated projection data, can be improved. It is a further object of the present invention to provide a reconstruction apparatus for iteratively reconstructing an image of a region of interest, which comprises the forward projection apparatus, and an imaging apparatus for generating an image of a region of interest, which comprises the reconstruction apparatus.

In a first aspect of the present invention a forward projection apparatus for performing a forward projection through an image is presented, wherein the forward projection apparatus comprises:

a ray providing unit for providing rays traversing the image, the rays being fictive rays arranged along straight lines emanating from a fictive radiation source, an interpolation unit for determining interpolated values located on the provided rays, wherein the interpolation unit is adapted to apply an interpolation kernel to a plurality of image elements of the image for determining the interpolated values, a summation unit for summing the interpolated values located on a respective ray for determining a projection value for the respective ray, wherein at least one of the number of provided rays, a ray spacing between the provided rays and a kernel width of the interpolation kernel is varied depending on the ray width relative to an effective image element spacing between the image elements of the image, wherein the image elements are arranged in a grid and wherein the effective image element spacing for a ray is defined as a projection of an image element spacing parallel to a main axis of the grid onto a line being perpendicular to the ray.

Since at least one of the number of provided rays, a ray spacing between the provided rays and the kernel width of the interpolation kernel is varied depending on the ray width relative to the effective image element spacing, artifacts in the simulated projection values forming the projection data and, thus, in an image, which is iteratively reconstructed by using the simulated projection data, can be reduced, thereby improving the quality of the simulated projection data and the iteratively reconstructed image. For example, if the number of provided rays and/or the ray spacing between the provided rays is varied depending on the ray width relative to the effective image element spacing, aliasing artifacts can be reduced. Moreover, if the ray spacing between the provided rays and/or the kernel width of the interpolation kernel is varied depending on the ray width relative to the effective image element spacing, artifacts caused by varying effective kernel widths can be reduced.

The fictive radiation source corresponds preferentially to a real radiation source, in order to simulate a real forward projection.

The grid is preferentially a rectangular grid having rectangular main axes. The rectangular grid can be a two-dimensional grid or a three-dimensional grid. The effective image element spacing for a ray is preferentially defined as a projection of an image element spacing parallel to a main axis of the grid, which can be regarded as an interpolation axis of the grid, onto a line being perpendicular to the ray. The interpolation axis is an axis along which or parallel to which image elements are arranged, which are used for determining an interpolated value located on the respective ray, i.e. the interpolation kernel is arranged along or parallel to the interpolation axis.

The rays preferentially diverge such that the ray spacing increases with increasing distance to the fictive radiation source. Also the ray width may increase with increasing distance to the fictive radiation source, or the ray width may be constant with increasing distance to the fictive radiation source.

It is preferred that the ray providing unit is adapted to provide a) within a first region having a smaller distance to the fictive radiation source a first number of rays such that the ray width of the first number of rays is smaller than or equal to the effective image element spacing, and b) within a second region having a larger distance to the fictive radiation source a second number of rays such that the ray width of the second number of rays is smaller than or equal to the effective image element spacing, wherein the second number of rays is larger than the first number of rays, wherein the interpolation unit can be adapted to determine interpolated values on the first number of rays and on the second number of rays. The rays of the first number of rays and of the second number of rays are assigned to detection elements of a detection unit, wherein the summation unit is adapted to determine a projection value for a respective detection element by summing the interpolated values on the rays of the first number of rays and the second number of rays, which are assigned to the respective detection element. It is further preferred that the second number of rays is twice the first number of rays. Since in the first region and in the second region the number of rays are different, wherein in each of these regions the number of rays is chosen such that the ray width of the number of rays is smaller than or equal to the fictive image element spacing, in both regions aliasing artifacts are not caused, even if the ray width is different in the first and second regions. For example, if the provided rays diverge, the ray width of the first number of rays within the first region, which is closer to the fictive radiation source, can be smaller and the ray width of the second number of rays in the second region, which is more far away from the fictive radiation source, can be larger, without causing aliasing artifacts.

It is further preferred that the first region and the second region overlap in a transition region, wherein the summation unit is adapted to weightedly sum the interpolated values on the first number of rays and on the second number of rays in the transition region. This ensures a smooth transition between the first region and the second region and, thus, further improves the quality of the simulated projection values forming the projection data, which can be used for iteratively reconstructing an image of a region of interest.

It is further preferred that the ray providing unit is adapted to provide rays which are assigned to detection elements of a detection unit, wherein multiple rays are assigned to the same detection element, wherein the ray spacing between the multiple rays assigned to the same detection element is chosen such that, if the ray width relative to the effective image element spacing is larger, the ray spacing is larger. In this embodiment, the ray width is preferentially constant, i.e. with decreasing effective image element spacing, the ray width relative to the effective image element spacing increases. It is further preferred that each ray is related to an effective kernel width, wherein the effective kernel width is defined as a projection of the kernel width arranged parallel to a main axis of the grid onto a line being perpendicular to the respective ray, wherein the effective kernel widths of the rays assigned to the same detection element define an effective detection element kernel width and wherein the ray spacing of the rays assigned to the same detection element is chosen such that the effective detection element kernel widths of multiple detection elements are similar. Preferentially, the ray spacing of the rays assigned to the same detection element is chosen such that the effective detection element kernel widths of multiple detection elements are identical. This allows reducing, in particular, eliminating, artifacts which may be caused by different effective kernel widths.

It is further preferred that the interpolation unit is adapted to provide an interpolation kernel having a larger width, if the ray width relative to the effective image element spacing is larger. Also in this embodiment the ray width is preferentially constant, i.e. with decreasing effective image element spacing, the ray width relative to the effective image element spacing increases. It is further preferred that the interpolation unit is adapted to provide the interpolation kernel such that the effective kernel width is similar for each ray, wherein the effective kernel width is defined as a projection of the kernel width arranged parallel to a main axis of the grid onto a line being perpendicular to the respective ray. It is further preferred that the interpolation unit is adapted to provide an interpolation kernel having a kernel width which depends on the cosine of an angle between the respective ray and a line perpendicular to a main axis of the grid being preferentially the interpolation axis. Also this reduces, in particular, eliminates, artifacts which may be caused by a varying kernel width.

In a further aspect of the present invention a reconstruction apparatus for iteratively reconstructing an image of a region of interest from acquired projection data is presented, wherein the reconstruction apparatus comprises:
  a forward projection apparatus as defined in claim 1 for performing a forward projection through an image of the region of interest for generating simulated projection data,
  a backprojection unit for backprojecting data, which are based on at least one of the acquired projection data and the simulated projection data, for generating an image,
  a control unit for controlling the forward projection apparatus and the backprojection unit such that in an iteration step a forward projection and a backprojection are performed.

In a further aspect of the present invention an imaging apparatus for generating an image of a region of interest is presented, wherein the imaging apparatus comprises an acquisition unit for acquiring projection data of the region of interest and a reconstruction apparatus as defined in claim 10 for iteratively reconstructing an image of the region of interest from the acquired projection data. The imaging apparatus is preferentially a computed tomography apparatus. However, the imaging apparatus can also be another imaging modality like a nuclear imaging apparatus, for example, a positron emission tomography apparatus or a single photon emission computed tomography apparatus, or an x-ray C-arm apparatus. The imaging apparatus can be any apparatus which acquires projection data and which iteratively reconstructs an image from the projection data, wherein during the iterative reconstruction the above mentioned forward projection apparatus and a backprojection unit are used.

In a further aspect of the present invention a forward projection method for performing a forward projection through an imagen is presented, the image comprising a plurality of image elements, wherein the forward projection method comprises:
  providing rays traversing the image, the rays being fictive rays arranged along straight lines emanating from a fictive radiation source,
  determining interpolated values located on the provided rays, wherein an interpolation kernel is applied to a plurality of image elements of the image for determining the interpolated values, and
  summing the interpolated values located on the respective ray for determining a projection value for the respective ray,
wherein at least one of the number of provided rays, a ray spacing between the provided rays and a kernel width of the interpolation kernel is varied depending on the ray width relative to an effective image element spacing between the image elements of the image, wherein the image elements are arranged in a grid and wherein the effective image element spacing for a ray is defined as a projection of an image element spacing parallel to a main axis of the grid onto a line being perpendicular to the ray.

In a further aspect of the present invention a computer program for performing a forward projection through an image is presented, wherein the computer program comprises program code means for causing a forward projection apparatus as defined in claim 1 to carry out the steps of the forward projection method as defined in claim 12, when the computer program is run on a computer controlling the forward projection apparatus.

It shall be understood that the forward projection apparatus of claim 1, the reconstruction apparatus of claim 10, the imaging apparatus of claim 11, the forward projection method of claim 12, and the computer program of claim 13 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
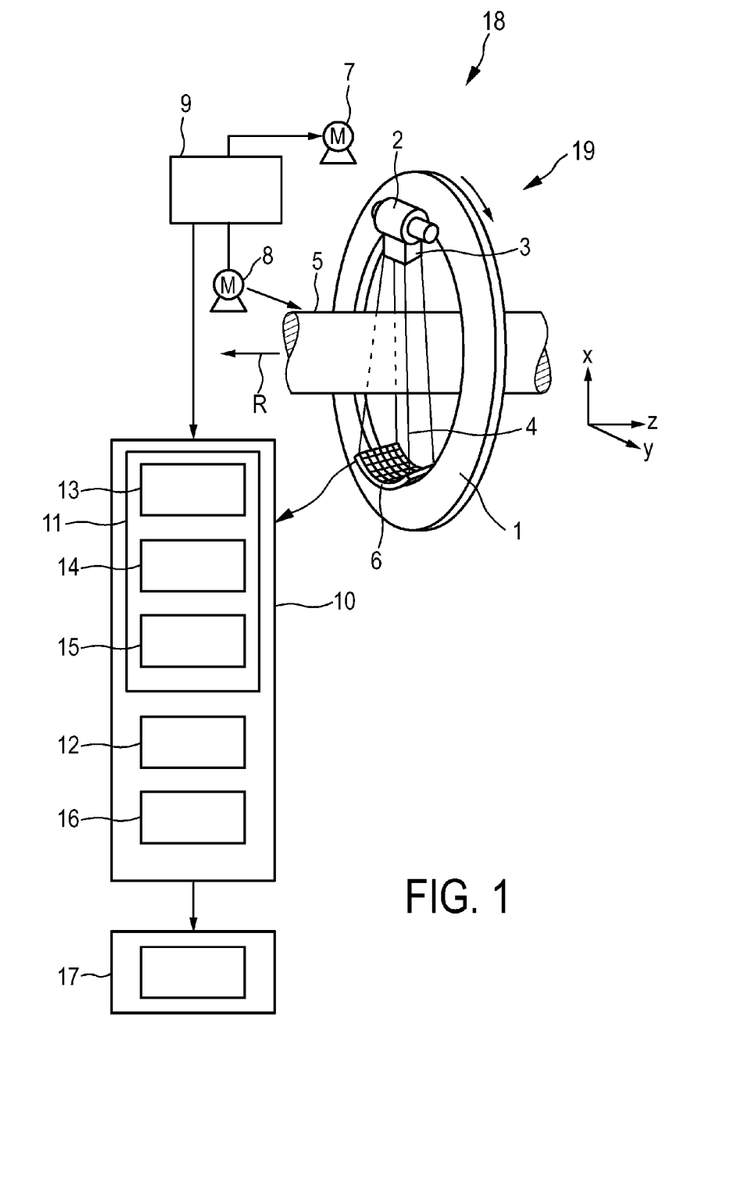
FIG. 1 shows schematically and exemplarily an embodiment of an imaging apparatus for generating an image of a region of interest.

FIG. 1 shows schematically and exemplarily an imaging apparatus for generating an image of a region of interest. In this embodiment, the imaging apparatus is a computed tomography apparatus 18. The computed tomography apparatus 18 includes a gantry 1 which is capable by of rotation about a rotational axis R which extends parallel to the z direction. A radiation source 2, which is, in this embodiment, an x-ray tube, is mounted on the gantry 1. The radiation source 2 is provided with a collimator 3, which forms, in this embodiment, a conical radiation beam 4 from the radiation generated by the radiation source 2. The radiation traverses an object (not shown), such as a patient, and a region of interest, which is preferentially located within the object, in an examination zone 5, which is, in this embodiment, cylindrical. After having traversed the examination zone 5 the radiation beam 4 is incident on a detection device 6, which comprises a two-dimensional detection surface. The detection device 6 is mounted on the gantry 1.

The computed tomography apparatus 18 comprises two motors 7, 8. The gantry is driven at a preferably constant but adjustable angular speed by the motor 7. The motor 8 is provided for displacing the object, for example, a patient, with arranged on a patient table in the examination zone 5, parallel to the direction of the rotational axis R or the z axis. The motors 7, 8 are controlled by a control unit 9, for instance, such that the radiation source 2 and the examination zone 5 and, thus, the region of interest within the examination zone 5, move relative to each other along a helical trajectory. However, it is also possible that the object or the examination zone 5 is not moved, but that only the radiation source 2 is rotated, i.e. that the radiation source moves along a circular trajectory relative to the object or the examination zone 5. Furthermore, in another embodiment, the collimator 3 can be adapted for forming another beam shape, in particular, a fan beam, and the detection device 6 can comprise a detection surface, which is shaped corresponding to the other beam shape, in particular, to the fan beam.

During a relative movement of the radiation source 2 and the examination zone 5 the detection device 6 generates projection data depending on the radiation incident on the detection surface of the detection device 6. Therefore, the radiation source 2, the elements for moving the radiation source 2 relative to the examination zone 5, in particular, the motor 7, 8 and the gantry 1, and the detection device 6 form an acquisition unit 19 for acquiring projection data of the region of interest.

The projection data are provided to an reconstruction apparatus 10 for iteratively reconstructing an image of the region of interest from the acquired projection data.

The reconstruction apparatus 1 comprises a forward projection apparatus 11 for performing a forward projection through an image of the region of interest for generating simulated projection data, a backprojection unit 12 for backprojecting data, which are based on at least one of the acquired projection data and the simulated projection data, for generating an image, and a control unit 16 for controlling the forward projection apparatus 11 and the backprojection unit 12 such that in an iteration step a forward projection and a backprojection are performed. In this embodiment, the iterative reconstruction is initialized with an initial predefined image, which can, for example, only comprise zeros as image elements. In an iteration step, the actual image, which is, in the beginning, the initial image, is forward projected by the forward projection apparatus for generating simulated projection data. The acquired projection data and the simulated projection data can be substracted from each other, and in the same iteration step the difference can be backprojected by the backprojection unit for updating the actual image. The control unit 16 is preferentially adapted to terminate the iterative reconstruction, if a termination condition is fulfilled. The termination condition is, for example, that a predefined number of iterations has been reached or that a deviation of the updated actual image and the actual image before being updated in the current iteration step is smaller than a predefined threshold. A more detailed description of this and other iterative reconstructions, which can use the forward projection apparatus 11, are disclosed in, for example, the chapter "Statistical image reconstruction methods for transmission tomography" by Fessler, Handbook of Medical Imaging, Vol. 2, SPIE Press, edited by J. M. Fritzpatrick and M. Sonka, pages 1-70 (2000), and the articles "Cardiac cone-beam CT volume reconstruction using ART" by Nielsen et al., Medical Physics, vol 32, no 4, pages 851-860 (2005), or "A three-dimensional statistical approach to improved image quality for multislice helical CT" by Thibault et al., Medical Physics, vol 34, no 11, pages 4526-4544 (2007).

The image generated by the reconstruction apparatus 10 is provided to a display 17 for displaying the generated image.

Also the reconstruction apparatus 10 is preferably controlled by the control unit 9. In another embodiment, the control unit 9 can also perform the control, which is, in this embodiment, performed by the control unit 16. In that case, the reconstruction apparatus 10 may not comprise the control unit 16.

The forward projection apparatus 11 comprises a ray providing unit 13 for providing rays traversing the actual image for generating projection values forming the simulated projection data. The rays are fictive rays emanating from a fictive radiation source. The rays are provided such that they simulate the acquisition of the real measured projection data. The fictive radiation source corresponds therefore to the real radiation source 2. A movement of the fictive radiation source is simulated, which corresponds to the real movement performed by the real radiation source 2 while acquiring the real measured projection data. Thus, the forward projection apparatus is adapted to simulate the acquisition geometry used while acquiring the real measured projection data.

The forward projection apparatus further comprises an interpolation unit 14 for determining interpolated values located on the provided rays, wherein the interpolation unit 14 is adapted to apply an interpolation kernel to a plurality of image elements of the image for determining the interpolated values, and a summation unit 15 for summing the interpolated values located on a respective ray for determining a projection value for the respective ray. At least one of the number of provided rays, a ray spacing between the provided rays and a kernel width of the interpolation kernel is varied depending on the ray width relative to an effective image element spacing between the image elements of the image, wherein the image elements are arranged in a grid having several main axes, and wherein the effective image element spacing is defined as a projection of an image element spacing parallel to a main axis of the grid onto a line being perpendicular to the respective ray. This will in the following be illustrated in more detail with reference to FIGS. 2 to 7.

Figure 2:
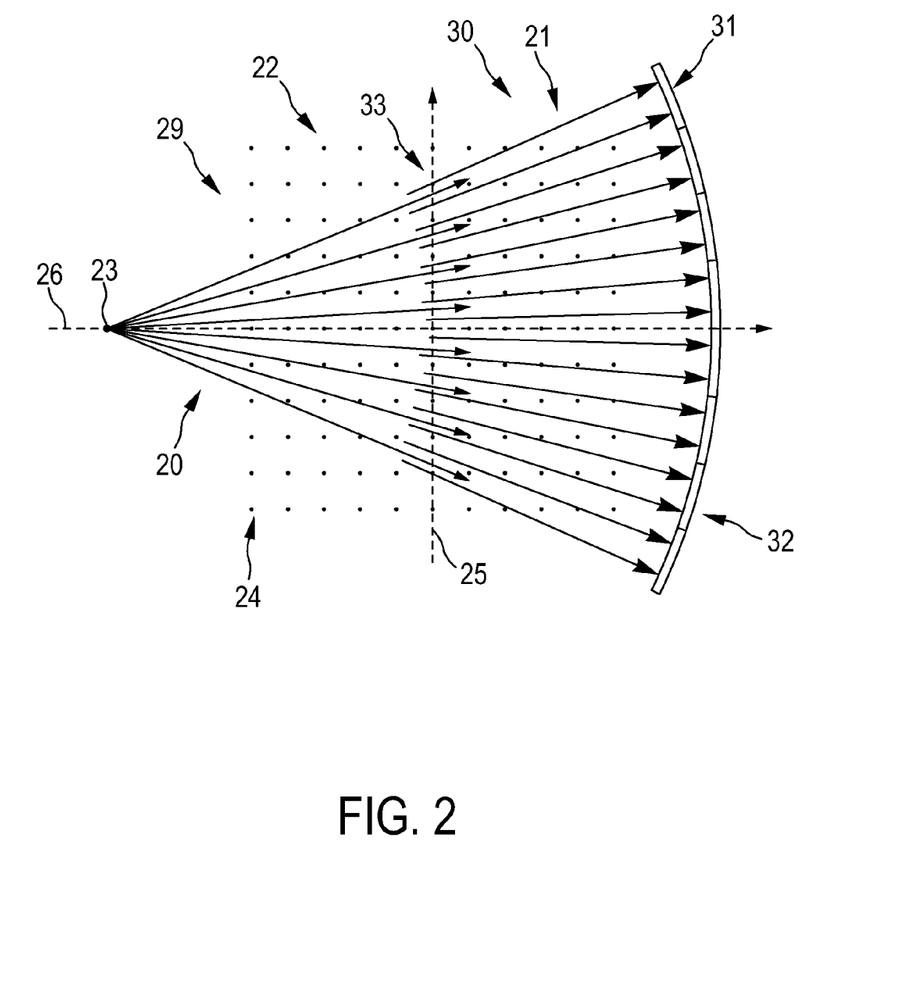
FIG. 2 illustrates a variation of a number of rays.

In FIG. 2, in a first region 29, which has a smaller distance to a fictive radiation source 23, a first number of rays 20 is provided such that the ray width of the first number of rays 20 is smaller than or equal to the effective image element spacing. Moreover, within a second region 30, which has a larger distance to the fictive radiation source 23, a second number of rays 21 is provided such that the ray width of the second number of rays 21 is smaller than or equal to the effective image element spacing, wherein the second number of rays 21 is larger than the first number of rays 20. In particular, the second number of rays 21 is twice the first number of rays 20. In FIG. 2, the image 22 comprises image elements 24 arranged in a rectangular grid having rectangular main axes 25, 26. The rays 20, 21 diverge such that for the same number of rays, i.e. the first number of rays 20 or the second number of rays 21, the ray spacing increases with increasing distance to the fictive radiation source 23. Also the ray width, which is, in this example, defined by the half distance to the directly neighbored rays, increases with increasing distance to the fictive radiation source 23.

In the example shown in FIG. 2, the interpolation unit 14 determines interpolated values on the first number of rays 20 and on the second number of rays 21 and the rays of the first number of rays 20 and of the second number of rays 21 are assigned to detection elements 31 of a detection unit 32, wherein the summation unit 15 determines a projection value for a respective detection element 31 by summing the interpolated values on the rays of the first number of rays 20 and the second number rays 21, which are assigned to the respective detection element 31.

Figure 3:
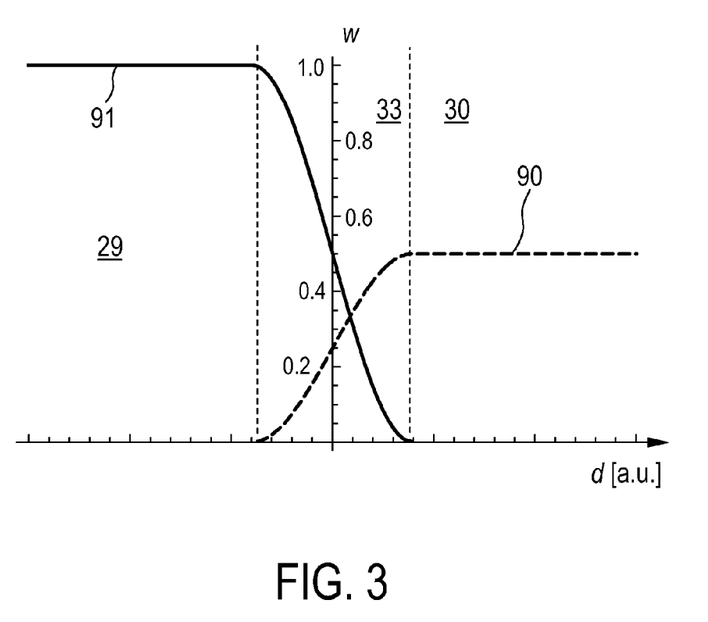
FIG. 3 shows exemplarily weights for weighing interpolated values on rays.

The first region 29 and the second region 30 overlap in a transition region 33, and the summation unit 15 is adapted to weightedly sum the interpolated values on the first number of rays 20 and on the second number of rays 21 in the transition region 33. This weighting is exemplarily illustrated in FIG. 3. FIG. 3 shows weights w, which are used for weighting interpolated values on rays directed to a certain detection element 31, depending on the distance d to the fictive radiation source 23. In the first region 29 the interpolated values on a ray of the first number of rays 20 is weighted with 1.0 as indicated by a first curve 91. In the second region 30 the interpolated values on the two rays of the second number of rays 21, which are directed to the same respective detection element 31, are weighted by 0.5 as indicated by the second curve 90. In the transition region 33 the interpolated values on the ray of the first number of rays 20, which is directed to the respective detection element 31, is weighted with a weight, which decreases with increasing distance to the fictive radiation source 23 as indicated by the first curve 91, and the weights for the interpolated values on the two rays of the second number of rays, which are directed to the same respective detection element 31, increase with increasing distance to the fictive radiation source 23. The weighted interpolated values, which are located on rays directed to the same respective detection element 31, are added for generating a projection value for the respective detection element 31. The weights are preferentially chosen such that for a certain distance d to the fictive radiation source the sum of the weights for interpolated values on rays directed to the same detection element 31 is one.

Figure 4:
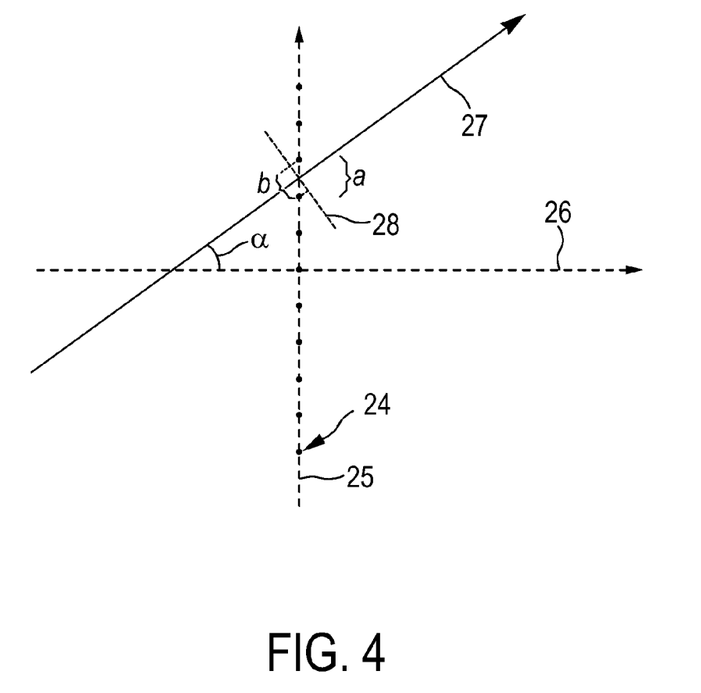
FIG. 4 illustrates schematically and exemplarily an effective image element spacing, FIG. 5 schematically exemplarily illustrates a known forward projection method.

FIG. 4 illustrates exemplarily the effective image element spacing b. FIG. 4 shows some image elements 24 arranged along a first main axis 25 and a second main axis 26 of the grid comprising the image elements 24. The further image elements 24 are not shown in FIG. 4 for clarity reasons. Moreover, exemplarily a ray 27 is shown, which encloses an angle α with the second main axis 26. The image element spacing a is projected onto a straight line 28, which is perpendicular to the ray 27, for determining the effective image element spacing b.

Figure 5:
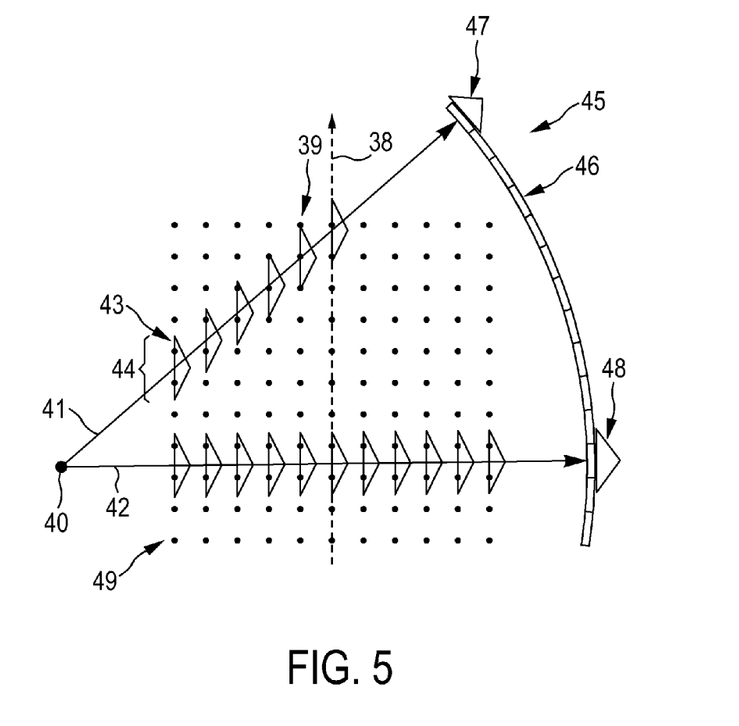

FIG. 5 illustrates a known forward projection procedure, wherein several fictive rays, which emanate from a fictive radiation source 40 and from which only two fictive rays 41, 42 are exemplarily shown, traverse an image 39 comprising image elements 49. Image elements, which are arranged parallel to a main axis 38 of a grid of the image elements 49 are interpolated by using interpolation kernels 43 having a kernel width 44. The effective kernel width with respect to ray 41, which is defined as the projection of the kernel width 44 arranged parallel to the main axis 38 of the grid onto a line being perpendicular to the respective ray 41, is smaller than the effective kernel width with respect to the ray 42. In FIG. 5, this is indicated by the triangles 47 and 48, respectively, which have a different width. For determining a projection value for a detection element 46 of a detector 45 interpolated values, which are located on the respective ray 41 or 42, are calculated by using the interpolation kernels 43, wherein the interpolated values located on the ray 41 are summed for generating a first projection value and the interpolated values located on the rays 42 are summed for generating a second projection value. Since the effective kernel width of the interpolation kernels is different with respect to the rays 41, 42, artifacts are caused in the calculated projection values, which may lead to artifacts in the finally reconstructed image.

Figure 6:
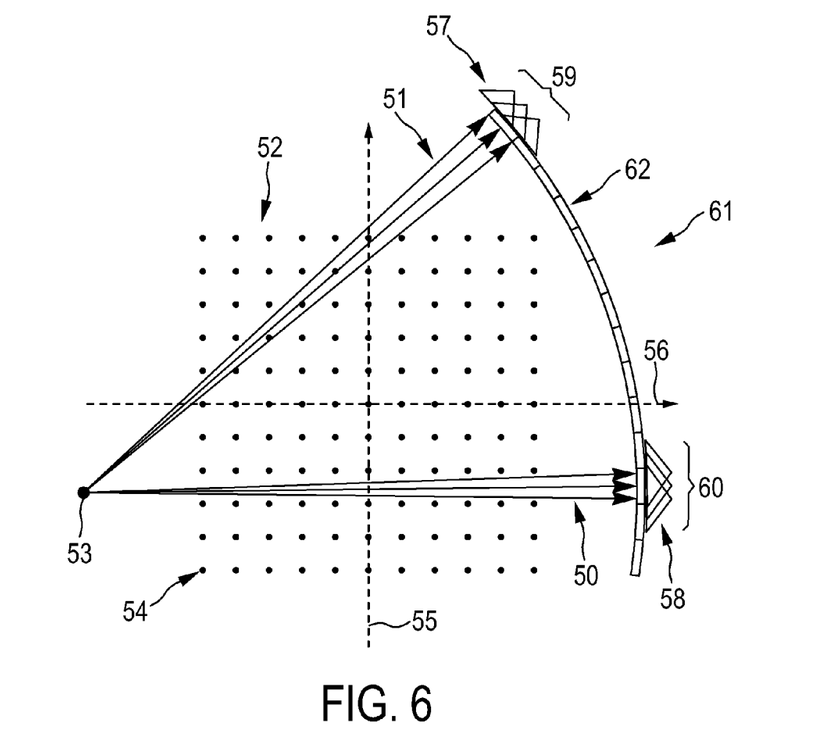
FIGS. 6 and 7 illustrate schematically exemplarily forward projection configurations for reducing an effect of varying effective interpolation kernel widths.

In order to reduce, in particular, in order to eliminate, this possible reason for artifacts, the ray providing unit 13 can be adapted to provide rays 50, 51 which are assigned to detection elements 62 of a detection unit 61 as schematically and exemplarily illustrated in FIG. 6. Multiple rays are assigned to the same detection element 62. The ray spacing between the multiple rays assigned to the same detection element 62 is chosen such that, if the ray width relative to the effective image element spacing is larger, the ray spacing is larger, wherein, in this embodiment, the ray width is assumed as being constant, i.e. with decreasing effective image element spacing, the ray width relative to the effective image element spacing increases. In FIG. 6, the rays 51 have a larger ray width relative to the effective image element spacing and, thus, the spacing between the rays 51 is larger than the spacing between the rays 50, for which the ray width relative to the effective image element spacing is smaller.

Similar to the arrangement shown in FIG. 5, the interpolation kernels are arranged such that the kernel widths are arranged parallel to the main axis 55 of the grid, in which the image elements 54 of the image 52 are positioned. Each of the rays 50, 51, which emanates from the fictive radiation source 53, is related to an effective kernel width, wherein the effective kernel width is defined as the projection of the kernel width arranged parallel to the main axis 55 of the grid onto a line being perpendicular to the respective ray. The effective kernel widths of the rays assigned to the same detection element define an effective detection element kernel width 59, 60, wherein the ray spacing of the rays assigned to the same detection element 62 of the detection unit 61 is chosen such that the effective detection element kernel width 59, 60 of multiple detection elements are equal.

Figure 7:
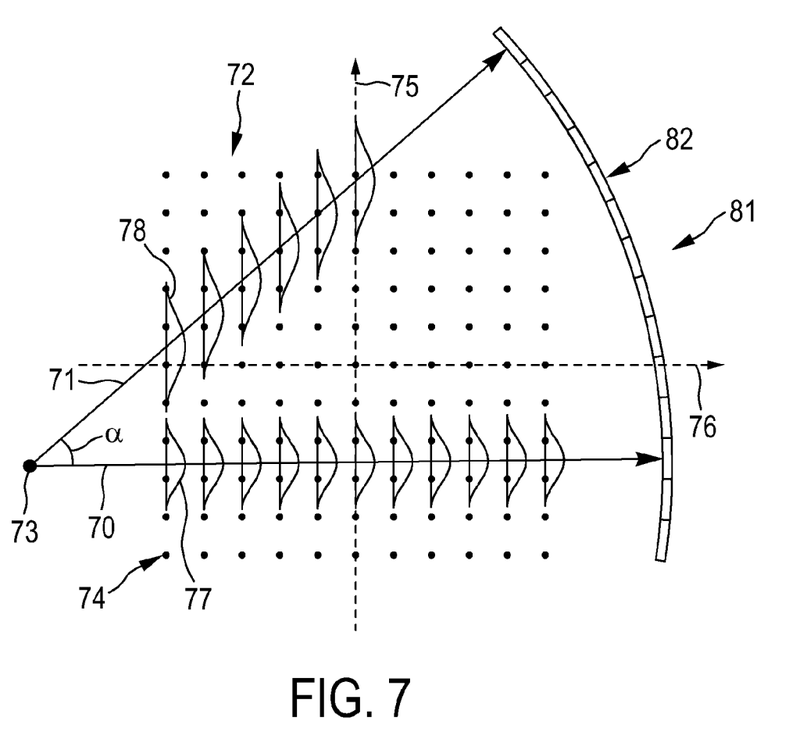

A further embodiment, which allows achieving an equal effective kernel width perpendicular to the respective ray 70, 71 directed to a respective detection element 82 of a detection unit 81, is schematically and exemplarily illustrated in FIG. 7. In this embodiment, the interpolation unit 14 is adapted to provide an interpolation kernel 77, 78 having a larger width, if the ray width relative to the effective image element spacing is larger. Also in this embodiment, the ray width is assumed as being constant, i.e. with decreasing effective image element spacing, the ray width relative to the effective image element spacing increases. The interpolation unit 14 is further adapted to provide the interpolation kernel 77, 78 such that the effective kernel width is equal for each ray, 70, 71, in particular, such that their kernel width depends on the cosine of an angle α between the respective ray and a line perpendicular to the main axis 75 of the grid.

The image can be represented by multi-dimensional Kaiser-Bessel windows as disclosed in, for example, the article "Multi-dimensional digital image representation using generalized Kaiser-Bessel window functions", Lewitt, J. Opt. Soc. Am. A, vol 7, no 10 (2000)). In this case, the image representation is based on basis functions of the form:

$$b(r) = \begin{cases} \dfrac{I_0\left(\beta\sqrt{1-(r/a)^2}\right)}{I_0(\beta)} & \text{for } r < a, \\ 0 & \text{for } r \geq a, \end{cases} \quad (1)$$

where r denotes the distance of a sample point from the center of the basis function, β denotes a shape parameter, and a denotes the radius of the basis function. The function $I_0$ is the zero order Bessel function. Alternatively, the base function can depend on a higher order Bessel function. Spherically symmetric basis functions like the Kaiser-Bessel function are often called "blobs". The interpolation function, i.e. the interpolation kernel, perpendicular to the respective ray can in this case be called the "footprint" of the blob. For the example blob given above, the footprint is:

$$p(s) = \dfrac{2a}{\beta I_0(\beta)} \sinh\left(\beta\sqrt{1-(s/a)^2}\right), \quad (2)$$

where s is the distance of the respective ray to the blob center, i.e. to the grid point.

As already mentioned above, the interpolation kernel can depend on the cosine of an angle α between the respective ray and a line perpendicular to the main axis, which is preferentially the interpolation axis, of the grid. In particular, the interpolation kernel $k_\alpha$ (y) as to apply with the respective main axis is the footprint p(s) stretched by a factor of 1/cos (α):

$$k_\alpha(y) = p(y/\cos\alpha). \quad (3)$$

Equation (3) can be used, if the interpolation axis is the y axis. If the interpolation axis is the x axis, in equation (3) y can be replaced by x.

If the image is a two-dimensional image, a one-dimensional interpolation kernel is used, which is arranged along a first main axis or a second main axis of the grid, which may be regarded as an x axis and an y axis, respectively. If the image is a three-dimensional image, two-dimensional interpolation kernels are preferentially used for performing the interpolations in a first main grid plane or a second main grid plane, wherein the first main grid plane and the second main grid plane are preferentially parallel to the x-z plane and the y-z plane, respectively. The two-dimensional interpolation kernel in the respective plane can be stretched by the factor 1/cos(β) in the x direction or in the y direction, and by the factor 1/cos(γ) in the z direction, wherein the angle β is defined as the angle between the respective ray and the x-z plane if the main grid plane is the y-z plane and as the angle between the respective ray and the y-z plane if the main grid plane is the x-z plane, and wherein the angle γ is the angle between the respective ray and the x -y plane, often called the cone-angle of the respective ray.

The image representation can, of course, also be based on other basis functions like a truncated Gaussian basis function or a generalized Kaiser-Bessel function with parameters, which are different to the parameters mentioned above with reference to equation (1), as, for example, disclosed in the article "Practical Considerations for 3D Image Reconstruction using Spherically Symmetric Basis Functions" by Matej and Lewitt, IEEE TMI, vol 15, no 1, pages 68-78 (1996).

Figure 8:
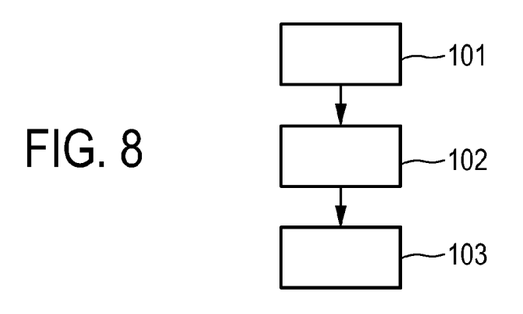
FIG. 8 shows a flowchart exemplarily illustrating an embodiment of a forward projection method for performing a forward projection through an image.

In the following an embodiment of a forward projection method for performing a forward projection through an image will exemplarily be described with reference to a flow-chart shown in FIG. 8.

In step 101, rays are provided, which traverse the image, and, in step 102, interpolated values are determined, which are located on the provided rays, wherein an interpolation kernel is applied to a plurality of image elements of the image for determining the interpolated values, wherein at least one of the number of provided rays, a ray spacing between the provided rays and the kernel width of the interpolation kernel is varied depending on the ray width relative to an effective image element spacing between image elements of the image, wherein the image elements are arranged in a grid having several main axes, and wherein the effective image element spacing is defined as a projection of an image element spacing parallel to a main axis of the grid onto a line being perpendicular to the respective ray. In step 103, the interpolated values located on a respective ray are summed for determining a projection value for the respective ray.

Figure 9:
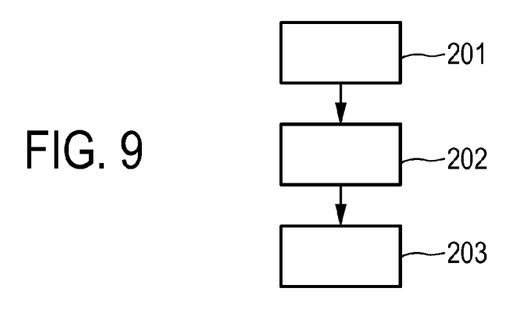
FIG. 9 shows exemplarily a flowchart illustrating an embodiment of an imaging method for generating an image of a region of interest.

In the following an imaging method for generating an image of a region of interest will exemplarily be described with reference to a flowchart shown in FIG. 9.

In step 201, projection data of the region of interest are acquired, for example, by using the acquisition unit 19 described above with reference to FIG. 1. In step 202, the acquired projection data are used for iteratively reconstructing an image of the region of interest. The iteration starts with an initial image, which may be an image having zero values or which may be another image, and in an iteration step a) a forward projection through the actual image, which is in the beginning the initial image, is performed, as described above with reference to FIG. 8, for determining simulated projection data, which correspond to the acquired projection data; b) a difference between the simulated projection data and the acquired projection data is calculated; and c) the difference is backprojected for updating the actual image of the region of interest. This iteration step is repeated until a termination condition is fulfilled. The termination condition is fulfilled if, for example, the iteration step has been repeated a predefined number of times, the difference between the acquired projection data and the simulated projection data is below a predefined threshold or if a deviation of the actual image updated in the present iteration step from the image, which has been updated in the previous iteration step, is below a threshold. In step 203, the iteratively reconstructed image of the region of interest is shown on the display 17.

Iterative reconstruction can be used to decrease the x-ray dose applied to persons or animals during a computed tomography scan. A shortcoming of iterative reconstruction is the high computational load during reconstruction due to the need for performing several forward projections and backprojections. In order to address this issue, the forward projection operation and the backprojection operation are preferentially implemented by using graphics processing units (GPUs). Thus, the forward projection apparatus and the backprojection unit are preferentially GPUs. The forward projection can be implemented in a very efficient manner by making use of the hardware implementation of three-dimensional textures in a GPU.

The forward projection can be implemented as so-called ray-driven forward projection. For example, for each detector pixel one or several rays can be casted through the image and the desired detector value, i.e. the desired projection value, is obtained by sampling the image along the one or several rays and by accumulating these samples. One particular problem, which may generally be present in this approach, in particular, in a fan-beam and a cone-beam geometry, is aliasing. If the casted rays diverge starting from a fictive radiation source, close to the radiation source the distance between the rays is relatively small and the image can be sampled appropriately. However, more far away from the fictive radiation source the rays have a larger distance with respect to each other, and this may lead to a violation of the Nyquist criterion, resulting in aliasing artifacts.

As described above with reference to FIG. 2, in order to overcome this aliasing problem several rays can be used, where needed, adaptively, i.e. an oversampling can be adaptively performed along the way from the fictive radiation source to the respective detection element. In the first region 29 only a single ray is needed per detection element 31, without undersampling the image, whereas in the second region 30 two rays per detection element 31 are used for sampling the image, in order to suppress aliasing artefacts. If the image element spacing in the image domain is equal to the ray spacing at the isocenter of the acquisition unit, one ray per detection element may be used to calculate the contribution of the image from the radiation source up to the isocenter without aliasing. For the more distant part of the image with respect to the radiation source the ray spacing is larger than the image element spacing and, in the embodiment described above with reference to FIG. 2, two sub-rays are used per detection element to calculate the contribution of the remaining part of the image to the respective projection value. In order to ensure a smooth transition between the area of a single ray per detection element and the area where more rays per detection element are used, there is a small transition range, i.e. the transition region 33, where, in this embodiment, three rays per detection element are calculated. In this transition area relative weights as shown in, for example, FIG. 3 are preferentially used.

Compared to a solution, which uses, for example, two rays per detection element along the entire way from the radiation source to the respective detection element, the additional effort for anti-aliasing can be reduced from a factor of 2 to 3/2 in the fan-beam case and from a factor of 4 to 5/8 in the cone-beam case, if the ray configuration described above with reference to FIG. 2 is used, i.e. if for the ray path from the radiation source up to the point where the ray density matches the image element density, only one ray per detection element is casted, and if for the further way to the respective detection element two sub-rays are casted through the image, which may be a two-dimensional or a three-dimensional image.

The above mentioned article by Joseph describes an implementation of the forward projection, which can use the ray and interpolation kernel configuration described above with reference to FIG. 5, i.e. FIG. 5 illustrates the forward projection proposed by Joseph, wherein for each ray a linear interpolation is performed within each grid line being parallel to the main axis 38. In FIG. 5, the linear interpolation is illustrated by triangular interpolation kernels. If the image is a three-dimensional image, the linear interpolation is performed within each main grid plane, which corresponds to the lines parallel to the main axis in the two-dimensional case.

One drawback of the forward projection proposed by Joseph is that the interpolation kernel has a constant width with respect to the main grid axis. This implies that the effective kernel width of the interpolation kernel perpendicular to the respective ray varies by a factor of $\sqrt{2}$. This is indicated in FIG. 5 by triangles 47, 48 at the respective detector element positions. Ray 42 shown in FIG. 5 is casted perpendicular to the main axis 38. The full-width-at-half-maximum of the effective interpolation kernel is equal to the image element spacing. The other ray 41 is casted almost at 45 degrees with respect to the main axis 38 such that the effective kernel width for this other ray 41 is about the image elements spacing divided by $\sqrt{2}$.

Several rays per detection element can be casted, for example, in order to avoid aliasing artifacts. In this case, the effect of the varying effective kernel width can be compensated by a properly selected spacing of the rays, which are directed to the same respective detection element and which may be regarded as sub-rays, as described above with reference to FIG. 6. By using a larger spacing between the rays with the smaller effective kernel width it can be achieved that the total effective kernel width of the average of the, in the embodiment described above with reference to FIG. 6, three individual rays is kept constant for all ray angles. Of course, the invention is not restricted to a certain number of individual rays casted per detection elements through the image. For example, also more than three rays can be casted per detection element.

An alternative way for handling the problem of varying effective kernel widths is described above with reference to FIG. 7. Higher order interpolation kernels are used instead of a linear interpolation kernel, which may be used in the two-dimensional case, or instead of a bi-linear interpolation kernel, which may be used in a three-dimensional case, within each line being parallel to main grid line or axis in the two-dimensional case or within each main grid plane in the three-dimensional case. The kernel width can be adjusted to the angle between the respective ray and the lines being parallel to the main axis or main grid plane, respectively, to ensure a constant kernel width perpendicular to the respective ray. In particular, the interpolation kernels hitting the lines being parallel to the main axis or main grid planes, respectively, at a hitting angle can be stretched by the 1/cosine of the hitting angle, wherein the hitting angle can be the angle between a ray perpendicular to a main axis or main grid line and another ray, for which the interpolation kernel shall be defined.

Although in FIGS. 2 and 5 to 7 only two-dimensional images are shown, the invention is not limited to the two-dimensional case. The forward projection apparatus, the reconstruction apparatus and the imaging apparatus can be adapted to allow reconstructing two-dimensional images and/or three-dimensional images.

Although in FIGS. 2 and 5 to 7 only few rays are shown for clarity reasons, the forward projection apparatus is preferentially adapted to cast fictive rays to all detection elements of the detection unit, wherein one or several rays per detection element can be casted.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations like forward and backward projections performed by one or several units or devices can be performed by any other number of units or devices. For example, steps 101 to 103 and step 202 can be performed by a single unit or by any other number of different units. The calculations and/or the control of the forward projection apparatus in accordance with the forward projection method and/or the control of the imaging apparatus in accordance with the imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a forward projection apparatus for performing a forward projection through an image, wherein at least one of a number of rays for performing the forward projection, a ray spacing between the rays and a kernel width of an interpolation kernel for calculating interpolated values located on the rays is varied depending on the ray width relative to an effective image element spacing between image elements of the image. This allows reducing artifacts in simulated projection data and, thus, in an image, which is iteratively reconstructed by using the simulated projection data. For example, if the number of provided rays and/or the ray spacing between the provided rays is varied, aliasing artifacts can be reduced. Moreover, if the ray spacing between the provided rays and/or the kernel width of the interpolation kernel is varied, artifacts caused by varying effective kernel widths may be reduced.

The invention claimed is:

1. A forward projection apparatus for performing a forward projection through an image, the forward projection apparatus comprising:
    a ray providing unit for providing rays traversing the image, the rays being fictive rays arranged along straight lines emanating from a fictive radiation source,
    an interpolation unit for determining interpolated values located on the provided rays, wherein the interpolation unit is adapted to apply an interpolation kernel to a plurality of image elements of the image for determining the interpolated values,
    a summation unit for summing the interpolated values located on a respective ray for determining a projection value for the respective ray,
    wherein at least one of the number of provided rays, a ray spacing between the provided rays and a kernel width of the interpolation kernel is varied depending on the ray width relative to an effective image element spacing between the image elements of the image, wherein the image elements are arranged in a grid and wherein the effective image element spacing for a ray is defined as a projection of an image element spacing parallel to a main axis of the grid onto a line being perpendicular to the ray.

2. The forward projection apparatus as defined in claim 1, wherein
    the ray providing unit is adapted to provide
        within a first region having a smaller distance to the fictive radiation source a first number of rays such that the ray width of the first number of rays is smaller than or equal to the effective image element spacing,
        within a second region having a larger distance to the fictive radiation source a second number of rays such that the ray width of the second number of rays is smaller than or equal to the effective image element spacing, wherein the second number of rays is larger than the first number of rays,
    the interpolation unit is adapted to determine interpolated values on the first number of rays and on the second number of rays,
    the rays of the first number of rays and of the second number of rays are assigned to detection elements of a detection unit wherein the summation unit is adapted to determine a projection value for a respective detection element by summing the interpolated values on the rays of the first number of rays and the second number of rays, which are assigned to the respective detection element.

3. The forward projection apparatus as defined in claim 2, wherein the second number of rays is twice the first number of rays.

4. The forward projection apparatus as defined in claim 2, wherein the first region and the second region overlap in a transition region and wherein the summation unit is adapted to weightedly sum the interpolated values on the first number of rays and on the second number of rays in the transition region.

5. The forward projection apparatus as defined in claim 1, wherein the ray providing unit is adapted to provide rays which are assigned to detection elements of a detection unit, wherein multiple rays are assigned to the same detection element, wherein the ray spacing between the multiple rays assigned to the same detection element is chosen such that, if the ray width relative to the effective image element spacing is larger, the ray spacing is larger.

6. The forward projection apparatus as defined in claim 5, wherein each ray is related to an effective kernel width, wherein the effective kernel width is defined as a projection of the kernel width arranged parallel to a main axis of the grid onto a line being perpendicular to the respective ray, wherein the effective kernel widths of the rays assigned to the same detection element define an effective detection element kernel width and wherein the ray spacing of the rays assigned to the same detection element is chosen such that the effective detection element kernel widths of multiple detection elements are similar.

7. The forward projection apparatus as defined in claim 1, wherein the interpolation unit is adapted to provide an interpolation kernel having a larger width, if the ray width relative to the effective image element spacing is larger.

8. The forward projection apparatus as defined in claim 7, wherein the interpolation unit is adapted to provide the interpolation kernel such that the effective kernel width is similar for each ray, wherein the effective kernel width is defined as a projection of the kernel width arranged parallel to a main axis of the grid onto a line being perpendicular to the respective ray.

9. The forward projection apparatus as defined in claim 7, wherein the interpolation unit is adapted to provide an interpolation kernel having a kernel width which depends on the cosine of an angle between the respective ray and a line perpendicular to a main axis of the grid.

10. A reconstruction apparatus for iteratively reconstructing an image of a region of interest from acquired projection data, the reconstruction apparatus comprising:
 a forward projection apparatus as defined in claim 1 for performing a forward projection through an image of the region of interest for generating simulated projection data,
 a backprojection unit for backprojecting data, which are based on at least one of the acquired projection data and the simulated projection data, for generating an image,
 a control unit for controlling the forward projection apparatus and the backprojection unit such that in an iteration step a forward projection and a backprojection are performed.

11. An imaging apparatus for generating an image of a region of interest, wherein the imaging apparatus comprises an acquisition unit for acquiring projection data of the region of interest and a reconstruction apparatus as defined in claim 10 for iterative reconstructing an image of the region of interest from the acquired projection data.

12. A forward projection method for performing a forward projection through an image, the image comprising a plurality of image elements, the forward projection method comprising:
 providing rays traversing the image, the rays being fictive rays arranged along straight lines emanating from a fictive radiation source,
 determining interpolated values located on the provided rays, wherein an interpolation kernel is applied to a plurality of image elements of the image for determining the interpolated values, and
 summing the interpolated values located on the respective ray for determining a projection value for the respective ray,
 wherein at least one of the number of provided rays, a ray spacing between the provided rays and a kernel width of the interpolation kernel is varied depending on the ray width relative to an effective image element spacing between the image elements of the image, wherein the image elements are arranged in a grid and wherein the effective image element spacing for a ray is defined as a projection of an image element spacing parallel to a main axis of the grid onto a line being perpendicular to the ray.

13. A non-transitory computer readable storage medium storing a computer program for performing a forward projection through an image, the computer program comprising program code means for causing a forward projection apparatus as defined in claim 1 to carry out the steps of the forward projection method, when the computer program is run on a computer controlling the forward projection apparatus.

\* \* \* \* \*